United States Patent [19]
Shirai et al.

[11] Patent Number: 6,117,380
[45] Date of Patent: Sep. 12, 2000

[54] METHOD AND APPARATUS FOR MANUFACTURING TUBULAR BODY OF SYNTHETIC RESIN, AND INTAKE MANIFOLD OF SYNTHETIC RESIN

[75] Inventors: Junichiro Shirai; Akira Shimonishi; Daimon Okada, all of Ikeda; Ryuji Takashina, Higashihiroshima, all of Japan

[73] Assignee: Daikyo Co., Ltd., Higashihiroshima, Japan

[21] Appl. No.: 09/029,074

[22] PCT Filed: Jul. 2, 1997

[86] PCT No.: PCT/JP97/02282

§ 371 Date: Mar. 3, 1998

§ 102(e) Date: Mar. 3, 1998

[87] PCT Pub. No.: WO98/01280

PCT Pub. Date: Jan. 15, 1998

[30] Foreign Application Priority Data

Jul. 3, 1996 [JP] Japan .................................. 8-173387

[51] Int. Cl.[7] .............................. B29C 45/14; F02M 35/10
[52] U.S. Cl. ......................... 264/250; 264/255; 264/261; 264/263; 123/184.61
[58] Field of Search ........................ 123/184.59, 184.61; 264/328.11, 328.8, 250, 255, 261, 263

[56] References Cited

U.S. PATENT DOCUMENTS

| | | | |
|---|---|---|---|
| 4,301,775 | 11/1981 | Smart et al. | 123/184.61 |
| 4,652,227 | 3/1987 | Aoki | 425/191 |
| 4,928,870 | 5/1990 | Gat-Liquornik et al. | 228/107 |
| 5,080,574 | 1/1992 | Koga et al. | 425/526 |
| 5,245,955 | 9/1993 | Husted | 123/184.61 |
| 5,538,571 | 7/1996 | Miyajima | 156/73.1 |
| 5,728,409 | 3/1998 | Schad et al. | 425/130 |

FOREIGN PATENT DOCUMENTS

| | | |
|---|---|---|
| 0 568 560 | 11/1993 | European Pat. Off. . |
| 2 690 376 | 10/1993 | France . |
| 1 801 683 | 2/1971 | Germany . |
| 42 41 409 | 6/1994 | Germany . |
| 2-38377 | 8/1990 | Japan . |
| 3-230924 | 10/1991 | Japan . |
| 7-4830 | 1/1995 | Japan . |
| 7-205299 | 8/1995 | Japan . |

Primary Examiner—Noah P. Kamen
Assistant Examiner—Hai Huynh
Attorney, Agent, or Firm—Foley & Lardner

[57] ABSTRACT

Method and apparatus of manufacturing a synthetic resin tubular member having differently oriented inlet tube and outlet tube portions uses a pair of displaceable molding dies. One of the dies is rotatable relative to the other die. The molding dies have a core portion fitted to the tube end of one of the inlet and outlet tube portions and is slideable in a direction different from the direction in which the dies open and close. The method includes the steps of core insertion, die clamping, injection, die opening, core removal, ejection, and die rotation. Each time the molding die is rotated one step, a primary molding step, in which two molding halves of the tubular member are formed, and a secondary molding operation, in which the two molding halves are joined, are formed, so that a finished tubular member is obtained for each rotational movement of the molding dies. A melted resin is filled into an interior passage defined along a peripheral edge of one of the dies after the molding dies are brought into abutment with each other to join the two halves. The finished product can be a synthetic resin manifold. The manifold has a plurality of outlet tube portions branching from an inlet tube portion. One of the two halves has both the inlet and out tube portions. That is, the inlet and outlet portions are monolithic to provide seamless inlet and outlet.

7 Claims, 13 Drawing Sheets

METHOD AND APPARATUS FOR MANUFACTURING TUBULAR BODY OF SYNTHETIC RESIN, AND INTAKE MANIFOLD OF SYNTHETIC RESIN

TECHNICAL FIELD

The present invention relates to a method and apparatus for manufacturing a synthetic resin-made tubular member having differently oriented inlet and outlet tube portions, and to a synthetic resin-made intake manifold for an internal combustion engine.

BACKGROUND ART

As is well known, an intake manifold is connected to a cylinder head of an internal combustion engine (engine) for feeding intake air into combustion chambers of individual cylinders. The intake manifold is a considerably large-size component of the air-intake system, so for purposes of reducing the weight of the peripheral arrangement of the engine, the intake manifold is formed of synthetic resin instead of conventional light alloy (e.g., aluminum alloy and the like).

Since the intake manifold is an air-intake system component is exposed to lower temperature conditions than any air other-exhaust system component, it is feasible to form the intake manifold of synthetic resin (in particular, a synthetic resin of the type reinforced with fibers or the like). It is to be understood that the intake manifold is usually constructed in the form of a tubular member having plural outlet tube portions (equal in number to corresponding cylinders) branched from one inlet tube portion.

In the prior art, when manufacturing such an intake manifold from synthetic resin, separate halves in a pair, previously formed from synthetic resin, are brought in abutment against each other, and then joined together by applying an adhesive to their abutting surface or by thermally melting the abutting portions.

However, the intake manifold is subject to some degree of thermal effect and successive vibrations from the engine and the like, though temperature conditions are relatively low as compared with those in the exhaust system. Therefore, in order to stably ensure the reliability of the intake manifold for long-time use, it is necessary to use good care in the process of molding, with respect to various quality aspects, such as strength, rigidity, and sealing performance.

When aforesaid use conditions are considered, such prior art method as mentioned above can hardly be said to be sufficient to stably ensure high strength of bond between the separate halves and the sealing characteristics of the butt-joined portion. Further, for purposes of manufacturing a mass-production item such as intake manifold for mass-production automotive engines, a need exists for a method that can assure higher production efficiency.

As a method for molding a hollow tubular item, such as a synthetic resin-made pipe, it is known to bring synthetic resin-made halves into abutment against each other and fill a melted resin mass into an interior passage formed along peripheral edge of the abutting portions to thereby join the halves together to obtain a hollow molded product. It is also known to carry out such melted resin loading into the interior passage, within a molding die in which separate halves are molded when the separate halves are joined together as mentioned before.

By employing such a method, it is possible to more stably ensure high strength of bond between the so joined halves and good sealing performance of the buttjoined portion as compared to the prior art practice in which such joining is carried out by adhesion or thermal melting.

For example, in Japanese Patent Publication No. 2-38377, there is disclosed a die construction including one pair of dies one of the dies has a male molding portion and a female molding portion for molding one separate half set and the other die has a female molding portion and a male molding portion provided in opposed relation to the molding portions of the one die. In this conjunction, there is also disclosed a method (called "die slide injection (DSI) method") where after separate halves are simultaneously molded (injection molded) by using such a pair of dies, one of the dies is caused to slide relative to the other die so that separate halves left in respective female molding portions are brought into abutment with each other, with melted resin being injected onto peripheral edges of the abutting portions to join the two halves together.

According to this DSI method, productivity can be considerably enhanced over the prior art method in which molding of separate halves and abutting/joining of the halves are carried out at separate stages.

An arrangement that can further enhance production efficiency is disclosed in, for example, Japanese Patent Publication No. 7-4830 that which teaches a rotary injection molding die construction. This die construction is basically a combination of molding dies adapted to be opened and closed relative to each other such that one of the molding dies is rotatable relative to the other die over a predetermined angular range, each die having a molding section consisting of at least one male molding portion and two female molding portions in a repetitive sequence of male/female/female in the direction of rotation for each rotational run over the predetermined angular range. In this conjunction, there is also disclosed a rotary injection molding method (so-called die rotary injection (DRI) method) wherein by using such a molding die assembly, molding separate halves and joining a pair of abutted halves are carried out during each rotational (e.g., forward-reverse) movement so that a finished product can be obtained for each rotational movement.

As is well known, an intake manifold is such that its inlet tube portion is connected to an air feed-side component, such as surge tank, while on the other hand its outlet tube portion is connected to an engine cylinder head. Further, for the convenience of layout within the engine room, the intake manifold is generally constructed in such a way that the inlet tube portion and the outlet tube portion are differently oriented, with their center lines extending at a predetermined angle (e.g., about right angle) to each other.

When molding a tubular member of such a configuration, it is commonplace for at least one of the inlet tube portion and outlet tube portion to be oriented in a direction different from the direction in which the molding die assembly is opened and closed as it is combined along a parting line. As such, molding operation is difficult with respect to the open end of aforesaid portion.

In particular, the DRI method involves not only opening and closing of the molding die assembly, but also relative rotation of the constituent dies of the assembly. This makes it more difficult to form a tube end portion oriented differently from the direction in which the die assembly is opened and closed.

The present invention is directed toward solving the foregoing problems, and accordingly it is a primary object of the invention to provide a method and apparatus for manufacturing a synthetic resin-made tubular member including differently oriented inlet tube portion and outlet tube portion which enable easy molding of a tube end portion oriented differently from the direction in which the molding die assembly is opened and closed, and a synthetic resin-made intake manifold having sufficient joint strength and sealing characteristics.

DISCLOSURE OF THE INVENTION

In order to accomplish the above mentioned object, according to a first aspect of the present invention, there is provided a method of manufacturing a synthetic resin tubular member having differently oriented inlet tube portion and outlet tube portion wherein separate halves of the tubular member are molded in a pair of molding dies, the molded separate halves in the molding dies being brought into abutment with each other, a melted resin mass being filled into an interior passage defined along a peripheral edge of the abutted portions to thereby join the separate halves, the method comprising: using a pair of molding dies for die rotary injection molding (known as "DRI") adapted to be opened and closed relative to each other and rotatable in relation to each other over a predetermined angular range, the molding die pair having a molding section consisting of at least one male molding portion and two female molding portions in a repetitive sequence of male/female/female in the direction of rotation and at the intervals of the predetermined angular range, the molding die pair further having a slide core adapted to be fitted to a tube end portion of one of the inlet and outlet tube portions and slidable in a direction different from the direction in which die opening and closing is made; and carrying out the following steps:

That is, the step of core insertion for inserting the slide core into a molding portion of the molding die pair corresponding to the tube end portion of one of the inlet and outlet tube portions; the step of die clamping for closing and clamping the molding die pair; the step of injection for injecting a melted resin mass into a molding cavity defined by closing the pair of molding dies; the step of die opening for opening the pair of molding dies; the step of core removal for removing the slide core from the tube end portion; the step of ejection for ejecting a molded tubular member from the dies; and the step of die rotation for rotating the dies relative to each other over a predetermined angle.

By carrying out these steps, each time when one rotational movement of the molding dies is made, a primary molding operation for molding separate halves through a combination of the male molding portion and one female molding portion, and a secondary molding operation for joining a pair of separate halves through a combination of the female molding portions are performed so that a finished tubular member will be obtained for each rotational movement of the molding dies.

According to a second aspect of the invention, there is provided an apparatus for manufacturing a synthetic resin tubular member having differently oriented inlet tube portion and outlet tube portion, the apparatus comprising: a pair of molding dies assembled together so as to be opened and closed relative to each other, rotary means for rotating at least one of the molding dies over a predetermined angle relative to the other molding die, a plurality of slide cores to be fitted to the tube end of one of the inlet tube portion and outlet tube portion and slidable in a direction different from the direction in which the molding dies are opened and closed, a plurality of eject means for ejecting a molded tubular member from the molding dies, core drive means for driving one of the slide cores in the different direction in response to the opening and closing operation of the molding dies, eject drive means for driving one of the plurality of eject means in response to the opening and closing operation of the molding dies, and changeover means for switching over the connection of a molding die open/close mechanism with the core drive means and eject drive means and for switching over the slide core and eject means to be driven.

The molding dies each have a molding section consisting of at least one male molding portion and two female molding portions in a repetitive sequence of male/female/female in the direction of rotation for each rotational run over the predetermined angular range.

Each time when one rotational movement of the molding dies is made, a primary molding portion for molding separate halves is formed through a combination of the male molding portion and one female molding portion, and a secondary molding portion is formed for joining a pair of separate halves through a combination of the female molding portions, whereby a finished tubular member can be obtained for each rotational movement of the molding dies.

According to a third aspect of the invention, there is provided a synthetic resin manifold having a plurality of outlet tube portions branched from an inlet tube portion, with the outlet tube portions differently oriented from the inlet tube portion, wherein the synthetic resin manifold is obtained by bringing a pair of separate halves into abutment with each other in a corresponding pair of molding dies, and filling a melted resin mass into an interior passage defined along a peripheral edge of the abutted portions to thereby join the halves.

According to a fourth aspect of the invention, in the synthetic resin intake manifold presented as the third aspect of the invention, the separate halves are configured to be halves separated along a closed-loop parting line which extends to avoid the end surfaces of the inlet and outlet tube portions.

According to a fifth aspect of the invention, in the synthetic resin intake manifold presented as the third or fourth aspect of the invention, the pair of molding dies are rotary injection molding dies (known as DRI) adapted to be opened and closed relative to each other and rotatable in relation to each other over a predetermined angular range, the molding dies each having a molding section consisting of at least one male molding portion and two female molding portions in a repetitive sequence of male/female/female in the direction of rotation for each rotational run over the predetermined angular range, the molding dies further having a slide core adapted to be fitted to a tube end portion of one of the inlet and outlet tube portions and slidable in a direction different from the direction in which die opening and closing is made, wherein each time when one rotational movement of the molding die pair is made, a primary molding operation for molding separate halves through a combination of the male molding portion and one female molding portion, and a secondary molding operation for joining a pair of separate halves through a combination of the female molding portions are performed so that a finished component will be obtained for each rotational movement of the molding dies.

BEST MODE FOR CARRYING OUT THE INVENTION

One embodiment of the present invention will now be described in detail with reference to the accompanying drawings that illustrate by way of example the embodiment as applied to a die assembly for manufacturing an intake manifold of an engine intake system.

FIGS. 10 through 18 show an intake manifold W, which is a molded product in the form of a tubular member according to the present embodiment. As may be well appreciated from FIGS. 10 to 13, the intake manifold W includes, for example, one inlet tube portion Wi and a plurality (three in the present embodiment) of outlet tube portions Wo. The outlet tube portions Wo are arranged in such a way that a center line of the inlet tube portion Wi and a center line of each outlet tube portion Wo are angled to each other at a specified angle (generally right-angled in is the present embodiment) when viewed in side elevation. In other words, the inlet tube portion Wi and each outlet tube portion Wo are differently oriented.

The molded product W, as will be described in detail hereinafter, is a product manufactured in the form of a hollow tubular member by the so-called die rotary injection (DRI) method such that upper and lower halves $W_U$ and $W_L$ are each molded by one molding die, the halves $W_U$ and $W_L$ being butt-joined in the molding die.

Figure 12:
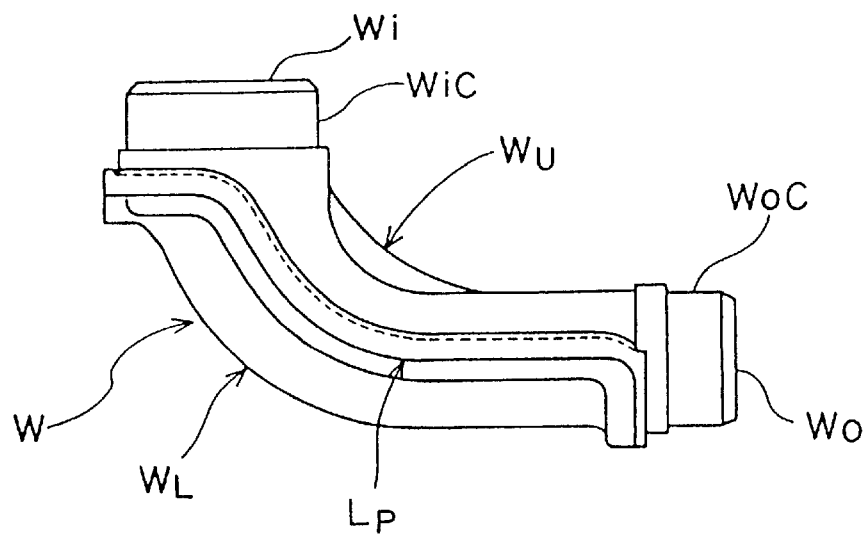
FIG. 12 is an explanatory view in side elevation of the molded product.
Figure 13:
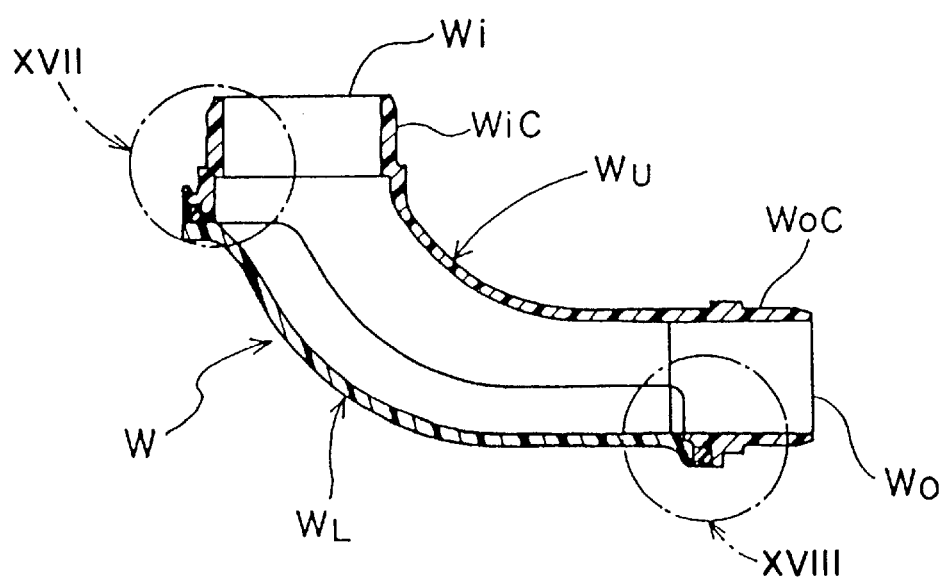
FIG. 13 is an explanatory view of the molded product in longitudinal section taken along lines XIII—XIII of FIG. 11.

In the present embodiment, as may be well understood from FIG. 12, a parting line Lp of the molded product W is set to avoid the parting line passing tube end portions of the inlet tube portion Wi and respective outlet tube portions Wo, that is, to avoid the parting line Lp appearing on tube end surfaces, and so as to define a closed loop extending along the periphery of the molded product W. It is noted in this conjunction that a butt-joined surface of the halves $W_U$ and $W_L$ is formed along the parting line Lp. By forming the parting line Lp in a closed loop fashion with the parting line kept away from the tube ends of the inlet tube portion Wi and respective outlet tube portions Wo it is possible to maintain the roundness of cylindrical portions WiC and WoC of respective tube ends in high precision. As a result, sealing performance at respective tube ends can be enhanced when they are integrated with associated parts (such as surge tank and cylinder head) to form an assembled structure.

In the present embodiment, preferably respective tube ends of the inlet tube portion Wi and outlet tube portions Wo are each integrally formed on the upper half Wu side, for example.

Figure 14:
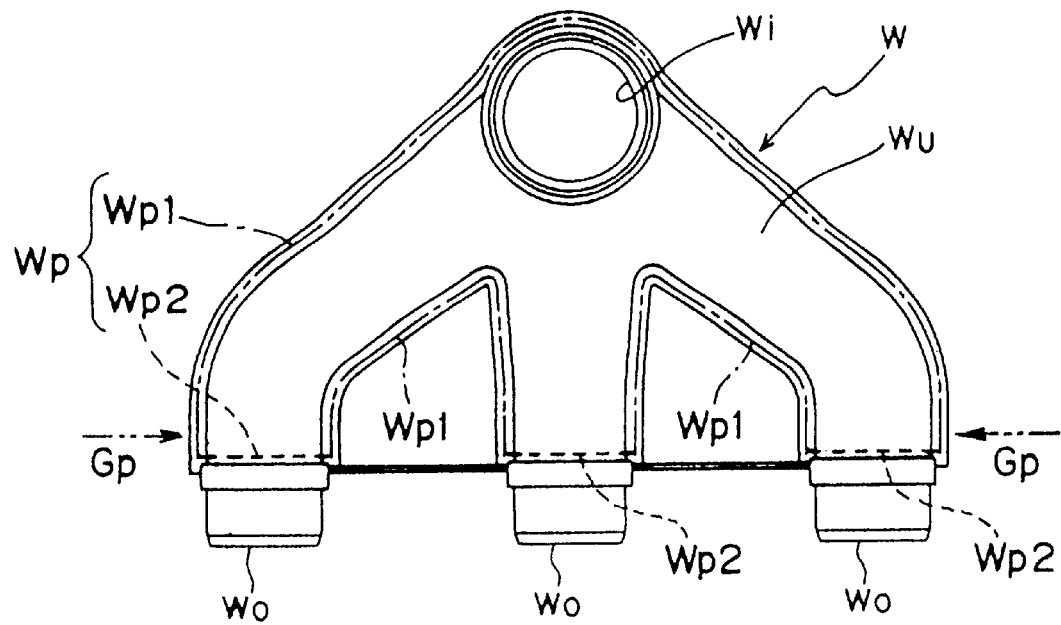
FIG. 14 is an explanatory plan view schematically showing the arrangement and construction of interior passages in the molded product.
Figure 15:
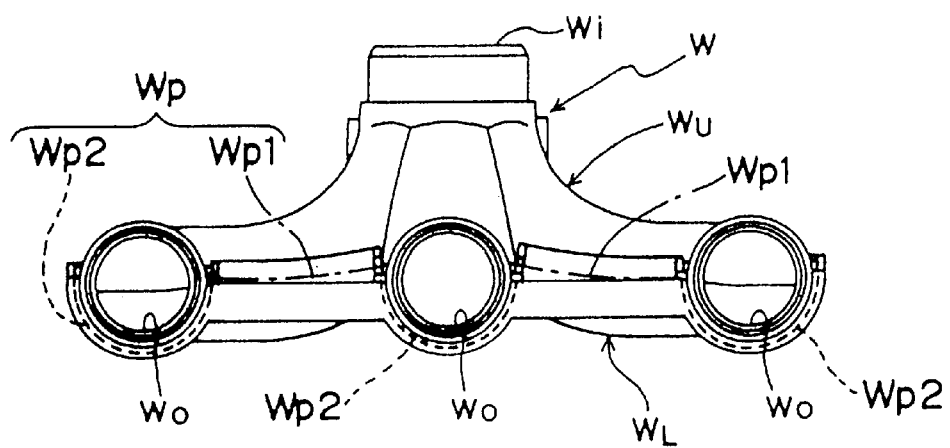
FIG. 15 is an explanatory view in front elevation schematically showing the arrangement and construction of the interior passages in the molded product.

As shown by chain line and dashed line curves in FIGS. 14 and 15, there are provided channel-like interior passages $W_p$ of closed section which are formed along the closed loop (that is, along the outer periphery of the abutting surface), preferably defined by wall portions of respective halves $W_U$ and $W_L$, such that after the upper and lower halves $W_U$ and $W_L$ are brought into abutment with each other, a resin mass (secondary resin) for joining the halves together is filled into the interior passage $W_p$.

In FIGS. 14 and 15, chain line curve shows passage portion $W_p 1$ extending along the peripheral edge of each respective half $W_U$, $W_L$, other than the vicinity of the end of outlet tube portion $W_o$, and dashed line curve shows a semicircular passage portion $W_p 2$ adjacent the end of outlet tube portion $W_o$.

In the present embodiment, a gate portion $G_p$ for secondary resin injection into interior passage $W_p$, as shown by arrows of chain double-dashed line in FIG. 14, is preferably provided, in plan view, at each of the outer side portions, right and left, of the interior passage $W_p$. and comparatively adjacent the semicircular passage portion $W_p 2$.

Figure 16:
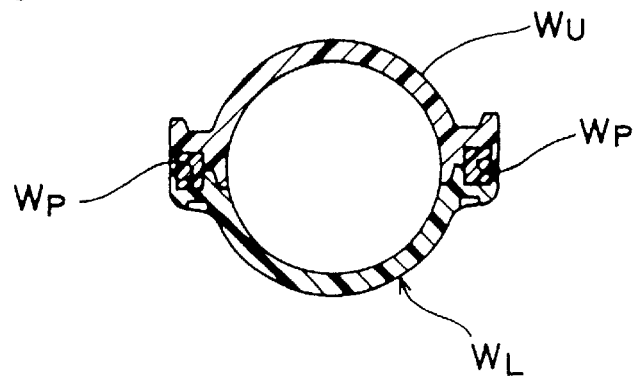
FIG. 16 is an explanatory view in longitudinal section taken along lines XVI—XVI of FIG. 10 for the molded product.
Figure 17:
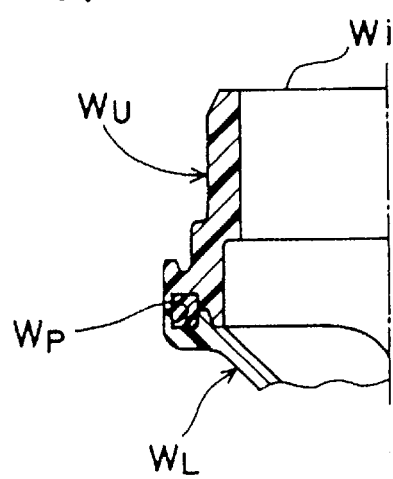
FIG. 17 is an explanatory enlarged view of portion XVII of the molded product in FIG. 13.
Figure 18:
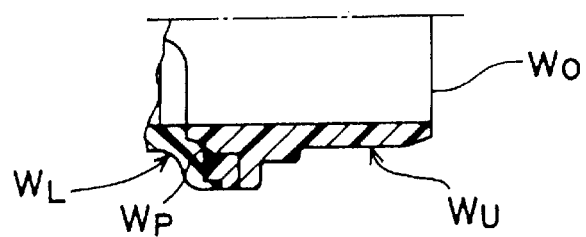
FIG. 18 is an explanatory enlarged view of portion XVIII of the molded product in FIG. 13.

FIGS. 16 to 18 illustrate by way of example sectional configurations of various parts of the interior passage $W_p$. In the present embodiment, as may be well appreciated from FIG. 18, preferably with respect to the central one of three outlet tube portions Wo of the molded product W, the lowermost portion of the interior passage $W_p$ is open over a limited length (e.g., about 10 mm at maximum) so that the degree of secondary resin filling in the interior passage $W_p$ can be ascertained by observing the degree of secondary resin filling at the opening.

In the present embodiment, the interior passage $W_p$ is more preferably configured to have a closed sectional configuration defined by wall portions of the halves $W_U$, $W_L$. Alternatively, however, it is possible to arrange that while the interior passage is partially open at the time when the halves are brought into abutment with each other, by setting the halves in a specified die, the opening is closed by die surfaces so that a closed sectional configuration is formed.

Next, the construction of molding dies employed in manufacturing (molding) the intake manifold W embodying the present invention will be described. In the present embodiment, the intake manifold W is preferably molded by the so-called die rotary injection (DRI) method.

FIGS. 1 to 5 are explanatory views in vertical section showing molding dies employed in molding the intake manifold. As may be well understood from FIGS. 1, 2 and 5, the molding die assembly comprises a stationary die 1 connected to a molding machine (e.g., injection molding machine, not shown), and a movable die 2 that performs opening and closing operations relative to the stationary die 1. As will be described hereinafter, the stationary die 1 is provided with a pivotal mechanism for pivotally moving predetermined portions including the molding portion of the die.

In FIGS. 1 to 5, the stationary die 1 and the movable die 2 are shown as being mounted on upper and lower sides. However, the arrangement of the dies 1, 2 is not limited to such vertical arrangement, but the dies may, for example, be horizontally (right and left) arranged in opposed relation for use.

The stationary die 1 includes a base plate 11 fixed to a body portion 10, a sprue bushing 12 fixed centrally to the base plate 11 and body portion 10, and a rotor 13 disposed coaxially with the sprue bushing 12. An injection head (not shown) of the molding machine is fixed to the sprue bushing 12.

The rotor 13 is basically configured to have a disc shape and has a center portion projecting in a cylinder-like fashion. A sprue 12a of the sprue bushing 12 is open on the surface of the center projection 13a.

Figure 5:
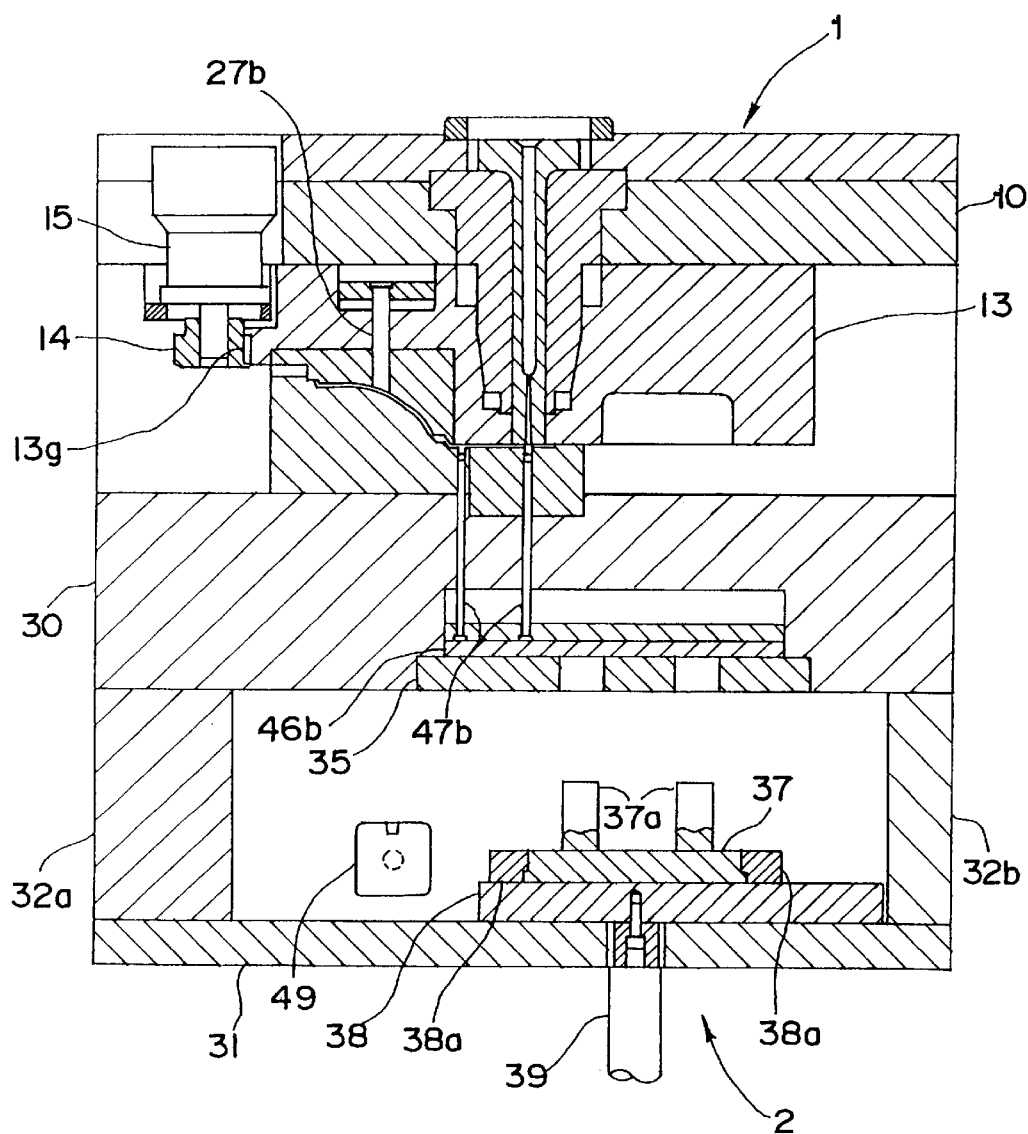
FIG. 5 is an explanatory view in longitudinal section taken along the line V—V of FIG. 7, showing molding die assembly in clamped condition.

As may be well appreciated from FIG. 5, the outer periphery of the rotor 13 is formed with a toothed portion 13g which meshes with a drive gear 14 disposed at an adjacent location. The drive gear 14 is connected to a drive power source 15, for example, a hydraulic motor, such that as the drive gear 14 is rotated by the drive power source 15, according to the direction of the rotation and the number of turns, the rotor 13 rotates over a predetermined angle (preferably 120° in the present embodiment) in a predetermined direction.

That is, the toothed portion 13g of the rotor 13, the drive gear 14, and the drive power source 15 constitute rotary means for rotating the rotor 13 a predetermined angle (120°).

The movable die 2 includes a base plate 31 disposed in parallel to the body portion 30, and a die plate 40 fixed to the body portion 30. The die plate 40 includes a molding section to be described hereinafter. The die plate 40, in effect, consists of a centrally disposed cylindrical portion 40d and three block members surrounding the cylindrical portion 40d.

The body portion 30 and base plate 31 are connected, for example, to a hydraulic drive means (not shown) so that opening and closing operation can be performed relative to the stationary die 1 at predetermined time intervals. Spacer blocks 32a, 32b (see FIG. 5) are interposed between the body portion 30 and the base plate 31.

The movable die 2 is provided with a slide die 33 slidable along the die plate 40 in a direction rectangular to the direction in which the movable die 2 is opened and closed, and a rod-like slide guide 34 for driving the slide die 33 in unison with the opening and closing operation of the movable die 2.

The slide die 33 corresponds to an outlet tube portion Wo of molded component W, and a core portion 33a of the die (see FIGS. 2 to 4) corresponds to the inner periphery of the outlet tube portion Wo, at its tube end portion, of the molded component. Front end portions of core members 36a, 36b, fixed to a body support plate 35 of the movable die 2, correspond to the inlet tube portion Wi of the molded component W.

Slide die 33 and slide guide 34, as will be described hereinafter, are provided at two locations within the movable die 2, i.e., at a location where the upper half $W_u$ is molded and at other location where upper and lower halves $W_u$, $W_L$, brought into abutment with each other, are joined by secondary resin.

At one end side of slide guide 34 there is formed a tapered portion 34c which engages a tapered bore 33c of the slide die 33. At the other end side of the slide guide 34 there is formed a recess 34d to be engaged by a guide drive plate 37 which is adapted to engage one of the slide guides 34.

The guide drive plate 37 is supported at its rear side by a back plate 38. As FIG. 5 shows, a pair of guide rails 38a are fixed to the back plate 38 for guiding slide movement of the guide drive plate 37 along the back plate 38.

The guide drive plate 37 moves along the guide rail 38a by being driven in a direction extending along the back plate 38 by drive means 49, such as hydraulic cylinder, (see FIG. 5), whereupon its engagement with slide guide 34 (that is, engagement with which one of slide guides 34, left or right) is switched over.

The changeover of the engagement between the guide drive plate 37 and slide guide 34 is effected by controlling operation of the drive means 49 according to a control signal from a controller (not shown) of the molding apparatus, and in complementary relation to the rotation of the rotor 13.

Connected to the back of the back plate 38 is a piston rod 39 of a hydraulic drive cylinder (not shown), for example, which extends and contracts in the same direction as the direction in which the movable die 2 operates (direction of die opening and closing), the piston rod extending through the base plate 31. As the piston rod 39 extends and contracts, slide guide 34 is driven (forward and backward) through the back plate 38 and guide drive plate 37.

That is, the drive cylinder (not shown), piston rod 39 thereof, back plate 38, guide drive plate 37, and slide guide 34 constitute core drive means which drive the core portion 33a of one of the slide dies 33, right or left, in response to the opening and closing operation of the molding dies 1, 2. This core drive means correspond to the "core drive means" defined in the claims of the present invention.

Provided in the interior of the body portion 30 of the movable die 2 are ejector pins 47a, 47b, 47c mounted respectively to ejector plates 46a, 46b, 46c, and ejector rings 48a, 48b. The ejector rings 48a, 48b have a function to eject (push upward) a molded product W and/or the tube end of inlet tube portion Wi of an upper half $W_u$ and are arranged so as to surround the outer peripheries of core portions 36a, 36b.

The ejector pins 47a, 47b, 47c, and ejector rings 48a, 48b correspond to the "eject means" defined in claims of the present invention.

The three ejector plates 46 (46a, 46b, 46c) are such that when the guide drive plate 37 is driven (advanced) toward the body portion 30 of the movable die 2, two projecting pins 37a, which project from the guide drive plate 37 are extended through the bores of the body support plate 35 to press ejector plates 46 (46a, 46b, 46c) at the back side so that two of the three ejector plates are pushed up.

Which two of the three ejector plates 46 (46a, 46b, 46c) are to be pushed up depends upon the state of engagement of the guide drive plate 37 with the slide guide 34. The state of engagement between the guide drive plate 37 and slide guide 34, as already stated, is determined when the guide drive plate 37 is driven by the drive means 49 (see FIG. 5) in a direction extending along the back plate 38 so that it goes into engagement with a recess 34d of one of the slide guides 34.

That is, the drive cylinder (not shown), piston rod 39 thereof, back plate 38, guide drive plate 37, projecting pins 37a, and ejector plates 46a, 46b, 46c constitute eject drive means that drives any of ejector pins 47a, 47b, 47c and ejector rings 48a, 48b in response to the opening and closing operation of the molding dies 1, 2.

The drive means 49 (see FIG. 5) operatively controlled by a control signal from the controller (not shown) of the molding apparatus, the guide drive plate 37 slidably supported on the back plate 38, and the recess 34d of the slide guide 34 constitute changeover means that switches over the engagement of the opening and closing mechanism of the molding dies 1, 2 with the core drive means and eject drive means according to the rotational movement of the rotor 13, and which switch over the core portion 33a of the slide die 33 and eject means which are to be driven.

The slide guide 34 is in its initial position when the movable die 2 is in its closed condition (see FIG. 1) in relation to the stationary die 1, and no drive force is applied to the slide die 33. Thus, the slide die 33 is positioned in a molding position (a position corresponding to the inner periphery of tube end portion of molded product outlet tube portion Wo).

After completion of the molding process, and at the time of die opening (see FIG. 2) the slide guide 34 remains stationary at its initial position so that the slide die 33 is kept at a molding position.

Figure 3:
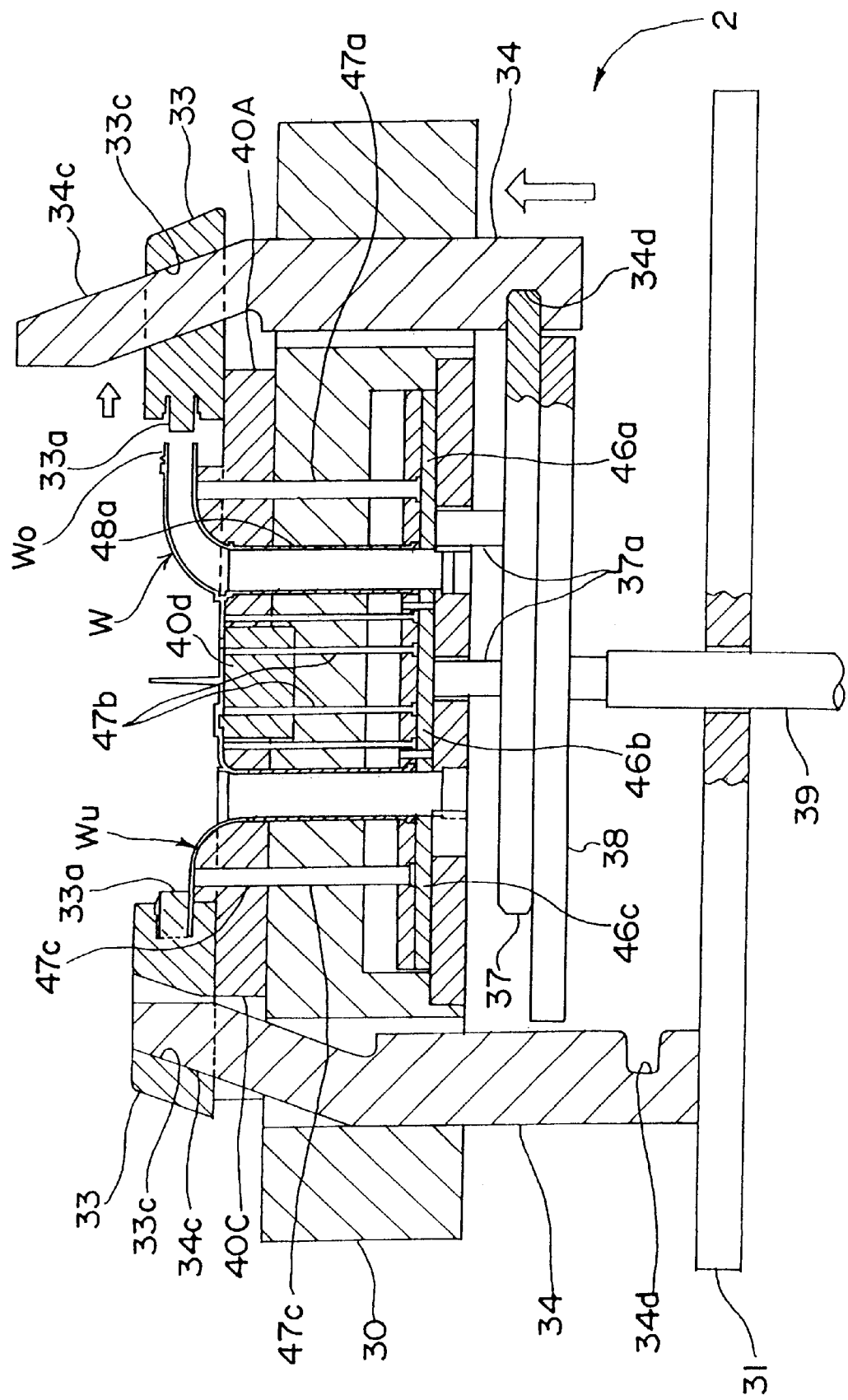
FIG. 3 is an explanatory view in longitudinal section similar to FIG. 1 showing a slide die of the molding die assembly in driven condition.

Subsequently, as FIG. 3 shows, the slide guide 34 is driven (advanced) toward the body portion 30 of the movable die 2. Accordingly, the slide die 33 is caused to slide outwardly in such a way that a tapered bore 33c of the slide die 33 extends along a tapered portion 34c of the slide guide 34, the core portion 33a being thus removed from the tube end portion of the molded product W at the outlet tube portion Wi.

In other words, the core portion 33a of the slide core 33, which is slidable in a direction different from (generally rectangular to) the direction in which the movable die 2 is, opened and closed is removed from the tube end portion (outlet tube portion Wo) of the finished component W.

In this way, according to the present embodiment, in molding an intake manifold W using the DRI method, it is possible to mold, without involving any inconvenience, the tube end portion of the outlet tube portion Wo oriented in a direction different from the direction in which the molding dies 1, 2 are opened and closed.

That is, by joining upper and lower halves $W_u$ $W_L$ with a secondary resin mass it is possible to more stably secure high bond strength of joined halves and good sealing performance of butt-joined portion as compared with the prior art in which adhesive bonding or heat melting is carried out for joining the halves, and by using the DRI method it is possible to achieve higher production efficiency. Furthermore, it is possible to easily manufacture an intake manifold having differently oriented inlet tube portion Wi and outlet tube portion Wo.

As the slide guide 34 is further advanced, two projecting pins 37a of the guide drive plate 37 are extended through two of the three holes 35h (right side two in the FIG. 4 example) of the body support plate 35 to push up ejector plates 46a, 46b, whereby ejector pins 47a, 47b and ejector rings 48a, 48b are actuated.

Figure 1:
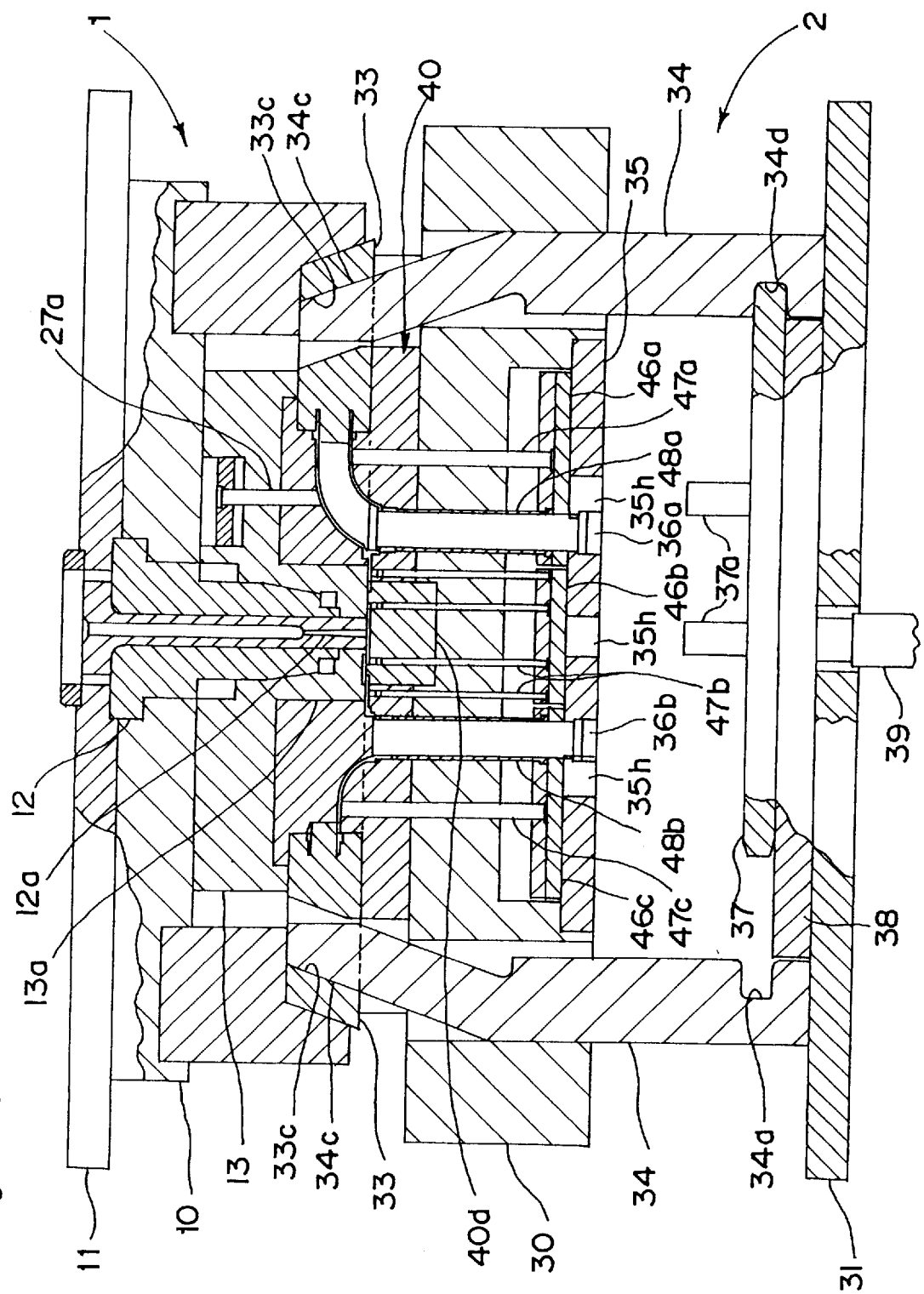
FIG. 1 is an explanatory view in longitudinal section taken along lines 1—1 of FIG. 7 for illustrating a molding die assembly in clamped condition with respect to an embodiment of the present invention.
Figure 2:
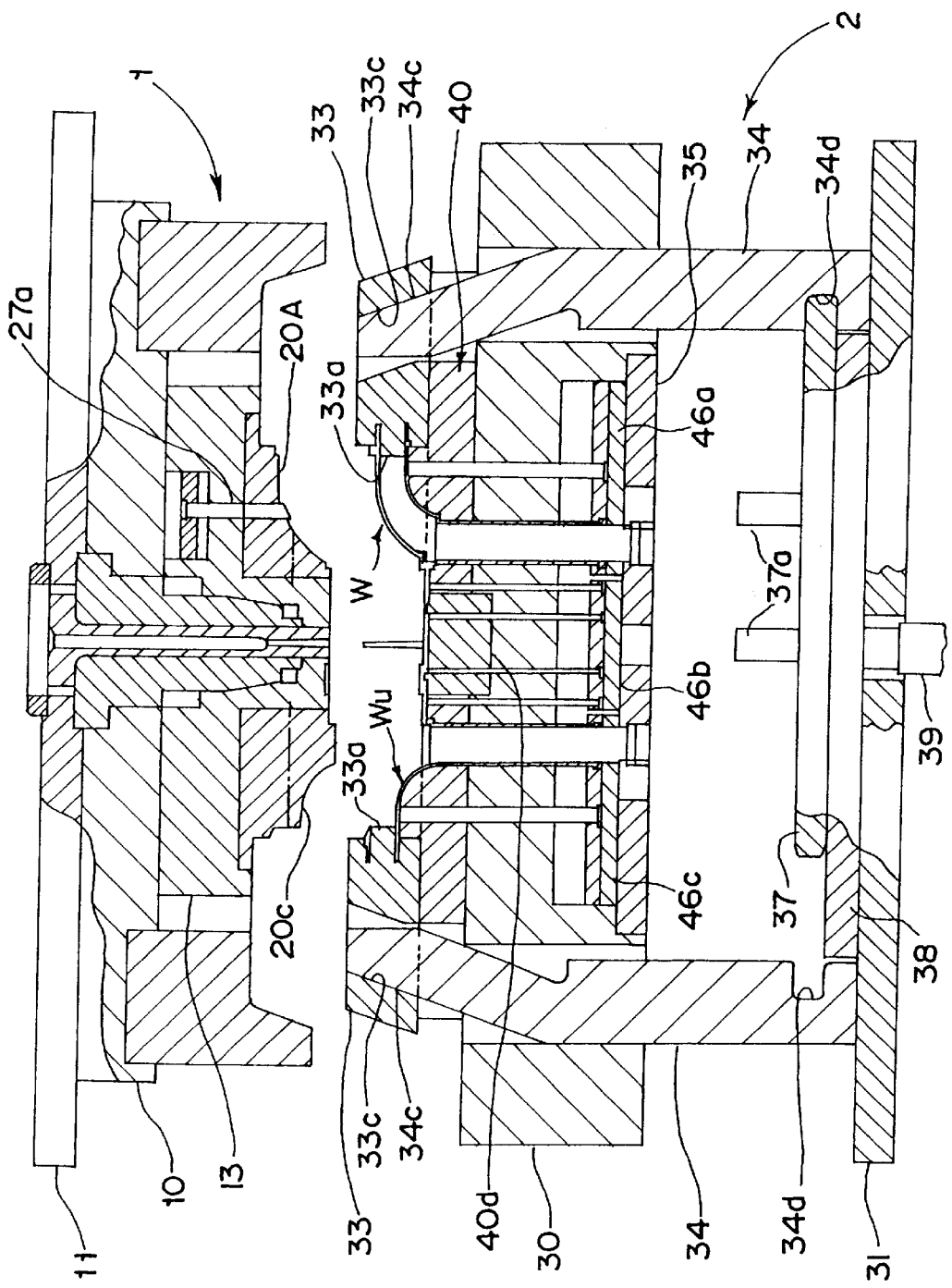
FIG. 2 is an explanatory view in longitudinal section similar to FIG. 1 which illustrates the molding die assembly in opened condition.

On the stationary die 1 side there are provided hydraulically driven ejector pins 27a, 27b (see FIGS. 1, 2 and 5). In a series of operation examples shown in FIGS. 1 to 4, ejector pin 27a is pushed outward after completion of molding operation and at the time of die opening (see FIG. 2).

Figure 6:
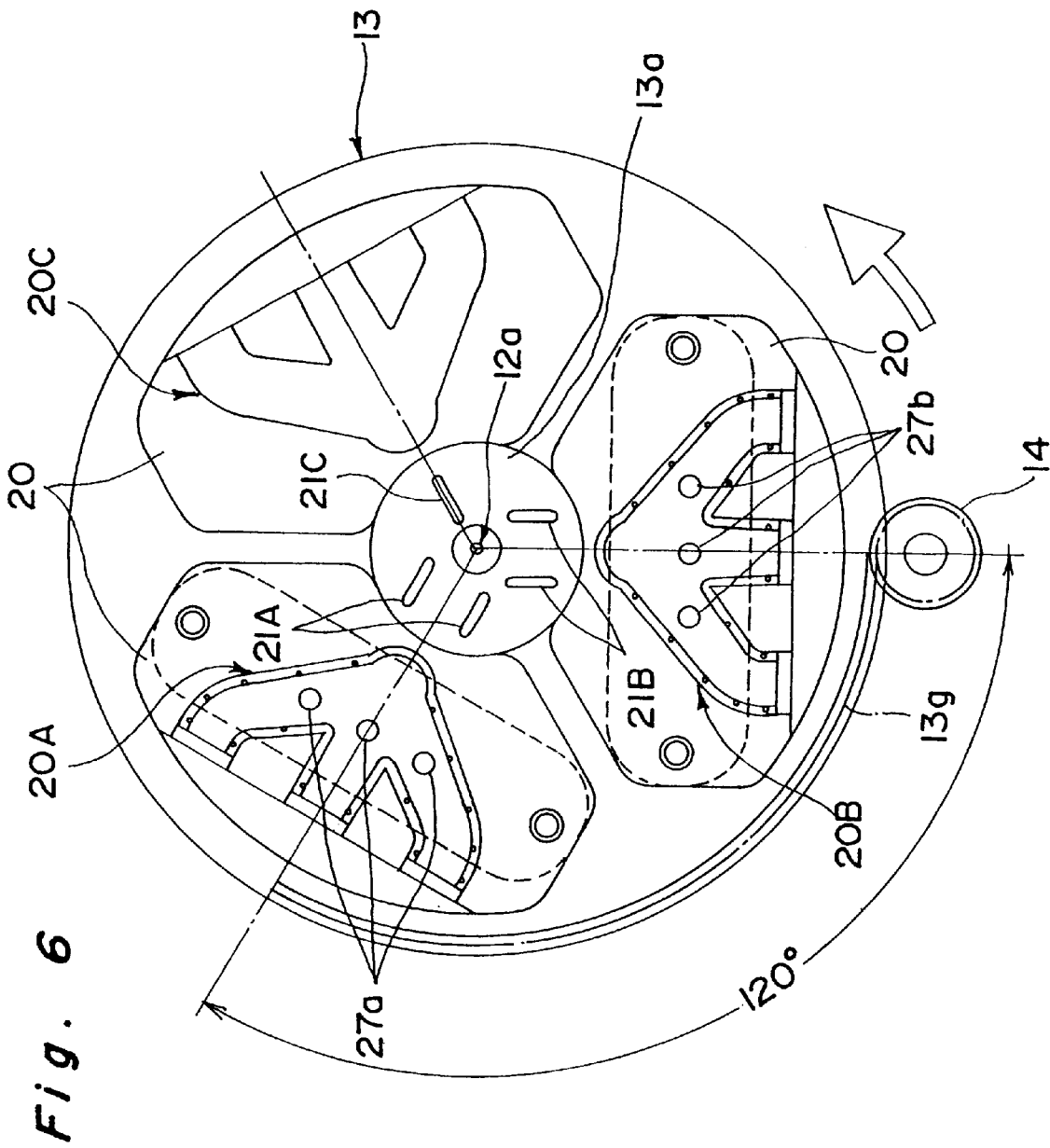
FIG. 6 is an explanatory view in front elevation of a rotor of a stationary die of the molding die assembly.

FIG. 6 is an explanatory view in front elevation showing the die matching surface side of the rotor 13 of the stationary die 1. As shown, the rotor 13 is provided with three die plate blocks 20 fixedly arranged around a center projection 13a in circumferentially equispaced relation (that is, at an angle of 120 degrees to each other). The die blocks 20 each are provided with a molding portion 20A, 20B, or 20C.

The molding portion 20C is a convexly formed male die portion, and the molding portions 20A, 20B are both concavely formed female die portions. That is, the rotor 13 of the stationary die 1 includes one male die portion 20C and two female die portions 20A, 20B.

It is to be noted that no resin passage is provided for connection to the molding portions 20A, 20B, 20C provided in the rotor 13 of the stationary die 1.

In the present embodiment, however, as will be described hereinafter, a number of elongated changeover slots 21 (21A, 21B, 21C) (5 slots in all in the present embodiment) are provided for switching over the connection between a resin passage connected to the molding portions of the movable die 2 and the sprue 12a of the sprue bushing 12.

These changeover slots 21 are such that one changeover slot 21C is oriented toward the molding portion 20C, two parallel changeover slots 21B are oriented toward the molding portion 20B, and two parallel slots 20A are oriented toward the molding portion 20A.

On the outer periphery of the rotor 13, as earlier mentioned, a toothed portion 13g adapted to go into mesh engagement with the drive gear 14 is provided over an arcuate length corresponding to at least an angle of 120 degrees so that as the drive gear 14 rotates (that is, according to the direction of the rotation and the number of turns) the rotor 13 rotates an angle of 120 degrees in a predetermined direction. The control of rotation with respect to the drive gear 14 (that is, rotation control of the rotor 13) is carried out by controlling the drive source 15, such as hydraulic motor (see FIG. 5).

In the present embodiment, the rotor 13 is designed to be rotated 120° in forward and reverse directions alternately at predetermined time intervals. For example, when the drive gear 14 rotates in the FIG. 6 condition, the rotor 13 rotates counterclockwise in FIG. 6.

Figure 7:
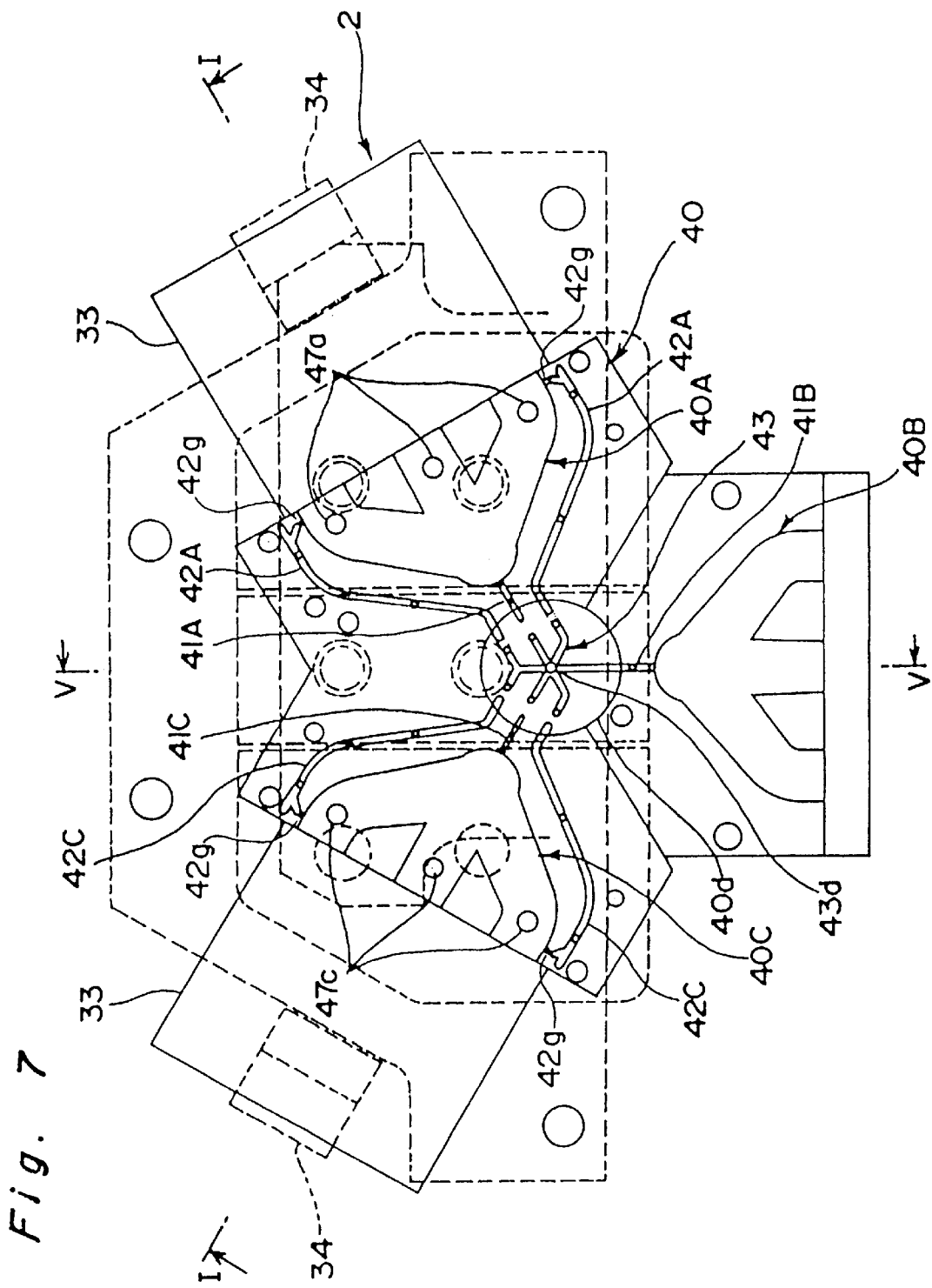
FIG. 7 is an explanatory view in front elevation of a movable die of the molding die assembly.

FIG. 7 is an explanatory view in front elevation showing the die plate 40 of the movable die 2 on the die matching surface side. As shown, on the die plate 40 there are provided three molding portions 40A, 40B and 40C in circumferentially equispaced relation (that is, at an angle of 120 degrees to each other).

The molding portion 40B is a convexly formed male die portion, and the molding portions 40A, 40C are both concavely formed female die portions. That is, the movable die 2 includes one male die portion 40B and two female die portions 40A, 40C.

FIGS. 1 to 4 are explanatory views in vertical section taken along lines 1—1 in FIG. 7, and FIG. 5 is an explanatory view in vertical section taken along line V—V in FIG. 7.

In the present embodiment, the die plate 40 of the movable die 2 is formed with two kinds of resin passages, i.e., primary and secondary resin passages 41 (41A, 41B, 41C), 42 (42A, 42C) connected directly to the molding portions 40A, 40B, 40C, and has branched resin passages 43 formed in a branched fashion in the central cylinder portion 40d of the die plate 40.

Connected to molding portions 40A and 40C of the female are primary resin passages 41A and 41C for supplying half ($W_U$, $W_L$) molding primary resin, and secondary resin passages 42A, 42C for supplying secondary resin for joining abutted halves $W_U$, $W_L$. Only primary resin passage 41B is connected to the male molding portion 40B.

The primary resin passages 41 (41A, 41B, 41C) are connected respectively to sides of those parts of molding portions 40 (40A, 40B, 40C) corresponding to molded product inlet ports Wi. The secondary resin passages 42 (42A, 42B) are provided in pair on both sides of each molding portion 40A, 40C, and are connected to gate portions 42g provided on sides of those parts of molding portions 40A, 40C corresponding to molded product outlet ports Wo.

The branched resin passage 43 is branched at a center portion 43d corresponding to the sprue 12a of the sprue bushing 12 when the movable die 2 is closed relative to the stationary die 1, and has six branch portions provided in corresponding relation to the primary and secondary resin passages 41 (41A, 41C), 42 (42A, 42C) connected to female molding portions 40A, 40C.

Each of the branch portions is so positioned that its front end, on an extension thereof, is spaced a predetermined distance from one end of the corresponding resin passage.

When the movable die 2 is closed relative to the stationary die 1, a predetermined resin passage is connected to a branched resin passage 43 (that is, to sprue 12a) by changeover slot 21 provided on the rotor 13 of the stationary die 1, and this connection is switched over by the rotation of the rotor 13.

The primary resin passage 41B connected to the male molding portion 40B is connected directly to the branched passage 43 (center portion 43d thereof). Therefore, the molding portion 40B is normally supplied with primary resin independently of the rotational position of the rotor 13. This molding portion 40B (male) is adapted to mold a lower half $W_L$ independently of the rotation of the rotor 13.

The process of molding intake manifolds W to be carried out by using a molding die assembly constructed as described above will be described herein below.

Initially, where the stationary die 1 is put in combination with the movable die 2 in such a condition as illustrated in FIG. 6, combinations of molding portions of the two dies 1, 2 are as follows:

Movable die 2, molding portion 40A (female)/stationary die 1, molding portion 20A (female)

Movable die 2, molding portion 40B (male)/stationary die 1, molding portion 20B (female)

Movable die 2, molding portion 40C (female)/stationary die 1, molding portion 20C (male)

Figure 8:
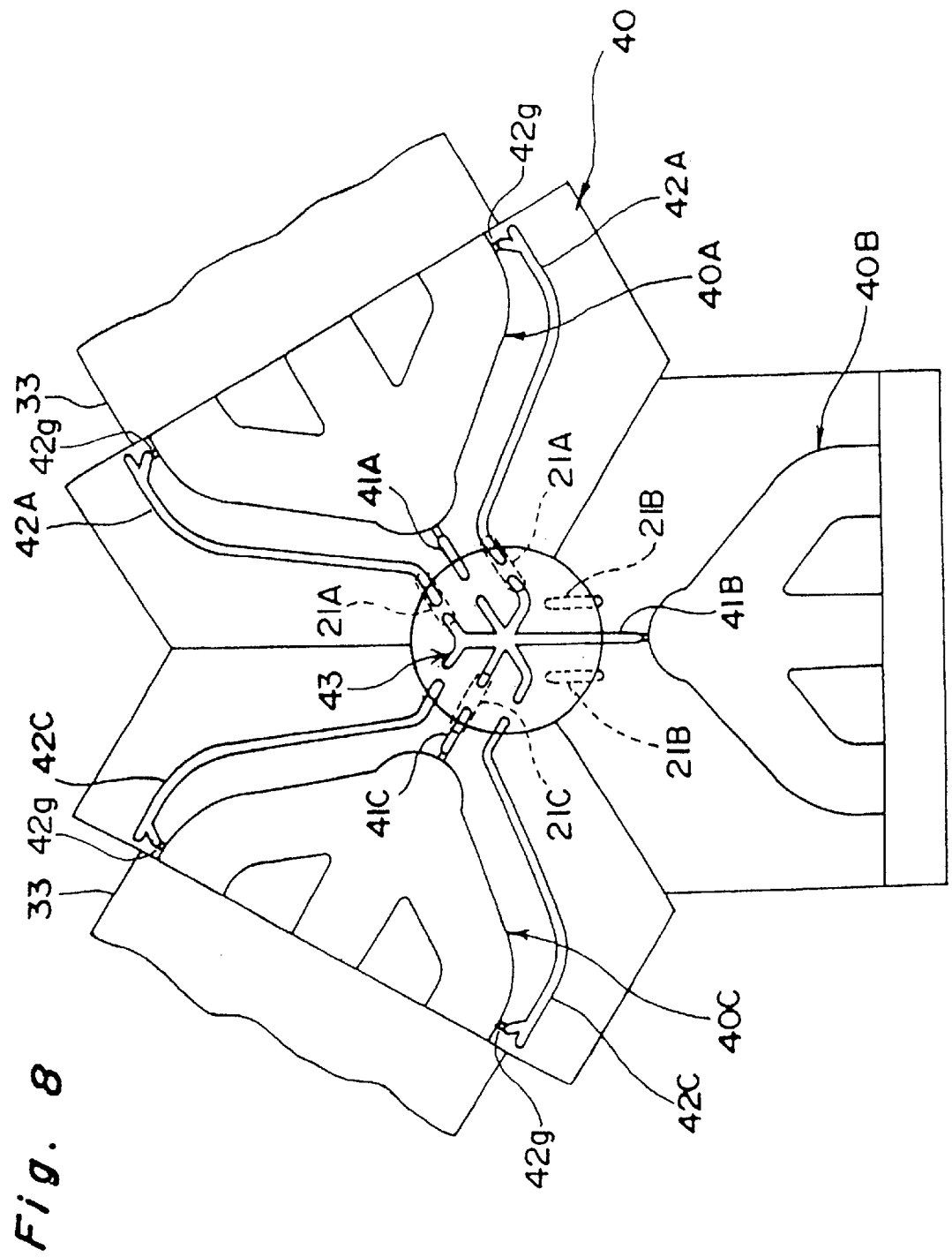
FIG. 8 is an explanatory view in front elevation for explaining a switched-over condition with respect to resin passages in the movable die.

In this case, changeover slot 21 of rotor 13 of stationary die 1 is at a rotational position shown by dashed lines in FIG. 8. That is, a pair of changeover slots 21A cause each secondary resin passage 42A for molding portion 40A of movable die 2 to communicate with branched resin passage 43, while changeover slot 21C causes primary resin passage 41C for molding portion 40C of movable die 2 to communicate with branched resin passage 43. Primary resin passage 41B for molding portion 40B of movable die 2 is normally held in communication with the branched resin passage 43.

Therefore, in this condition, the movable die 2 is brought into abutment with the stationary die 1 (see FIGS. 1 and 5), and die clamping is carried out, then melted resin is injected from a molder (not shown), whereupon melted resin is supplied through sprue 12a to the resin passages 42A, 41C, 41B in communication with the branched resin passage 43. It is to be noted in this connection that glass fiber reinforced fiber-mixed nylon resin, for example, is used as material resin in the present embodiment.

As a result, in molding cavities formed by combinations of molding portions of the stationary die 1 and movable die 2 the following molded forms are produced.

Molding portion 40A (female)/molding portion 20A (female): finished part W

Molding portion 40B (male)/molding portion 20B (female): lower half $W_L$

Molding portion 40C (female)/molding portion 20C (male): upper half $W_U$

It is noted in this connection that in the case of first resin injection, molded halves (upper half $W_U$ and lower half $W_L$) are not present in the molding cavity formed of the molding portion 40A (female)/molding portion 20A (female); therefore, melted resin injection is carried out after a dummy having same outer shape as one formed by abutting upper half $W_U$ and lower half $W_L$ with each other is set in the cavity.

The guide drive plate 37 is always so set as to engage the recess 34d of the slide guide 34 (the right-side slide guide in the example shown in FIGS. 1 to 4) which is engageable with the slide die 33 for finished part W.

In this case, when halves $W_U$, $W_L$ are brought into abutment with each other, the primary resin passage 41A connected to the molding portion 40A is disconnected from the interior passage $W_P$.

When the step of injection is completed, the movable die 2 is retreated from the stationary die 1 and die opening is carried out (see FIG. 2).

At this point of time, ejector pin 27a on the stationary die 1 side is pushed forward so that there is no possibility of the finished part W being left on the stationary die 1 side.

Next, the piston rod 39 is advanced so that the slide guide 34 engageable with the slide die 33 for finished part W is moved forward (see FIG. 3); then, the core portion 33a of the slide die 33 for finished part W is removed from the outlet port Wo for finished part W.

In this way, the core portion 33a of the slide die 33, which slides in a direction different from (orthogonal to) the direction in which the molding die (movable die 2) is opened and closed can be removed from the finished part W.

Then, the slide guide 34 is further advanced to thereby push up ejector plates 46a, 46b corresponding to projecting pins 37a so that ejector pins 47a, 47b and ejector ring 48 are actuated (for push-up movement).

Thus, the core member 36a is removed from the inlet port Wi for finished part W and, at the same time, the finished part W is released from the movable die 2 so that it can be removed out of the die.

In this way, with respect to two differently oriented tube end portions (inlet port Wi and outlet port Wo), core materials (core member 36a and slide die core portion 33a) can be removed without involving any inconvenience, and the finished part W can be thus removed.

The lower half $W_L$ molded in the cavity formed by the molding portion 40B (male) and molding portion 20B (female) are left in the molding portion 20B of the stationary die 1, and the upper half $W_U$ molded in the cavity formed by the molding portion 40C (female) and molding portion 20C (male) are left in the molding portion 40C of the movable die 2.

The rotor 13 of the stationary die 1 is rotated 120 degrees in the direction shown by arrow in FIG. 6, and thereafter the movable die 2 is moved forward and is brought into abutment with the stationary die 1. Then, die clamping is carried out.

At this point of time, the guide drive plate 37 is caused to slide along guide rail 37a of the back plate 37, whereupon its engagement with the slide guide 34 at the right side in FIGS. 1 to 4 is released and, in turn, the guide drive guide engages the recess 34d of the slide guide 34 at the left side in the figures.

Where the stationary die 11 in such rotational condition is put in combination with the movable die 2, combinations of molding portions of the two dies 1, 2 are as follows:

Movable die 2, molding portion 40A (female)/stationary die 1, molding portion 20C (male)

Movable die 2, molding portion 40B (male)/stationary die 1, molding portion 20A (female)

Movable die 2, molding portion 40C (female)/stationary die 1, molding portion 20B (female)

In this case, as already stated, lower half $W_L$ is left in the molding portion 20B of the stationary die 1, and upper half $W_U$ is left in the molding portion 40C of the movable die 2. Therefore, by rotating the rotor 13, the upper half $W_U$ and lower half $W_L$ are brought into abutment with each other in a cavity formed by the molding portion 40C (female) and molding portion 20B (female).

Figure 9:
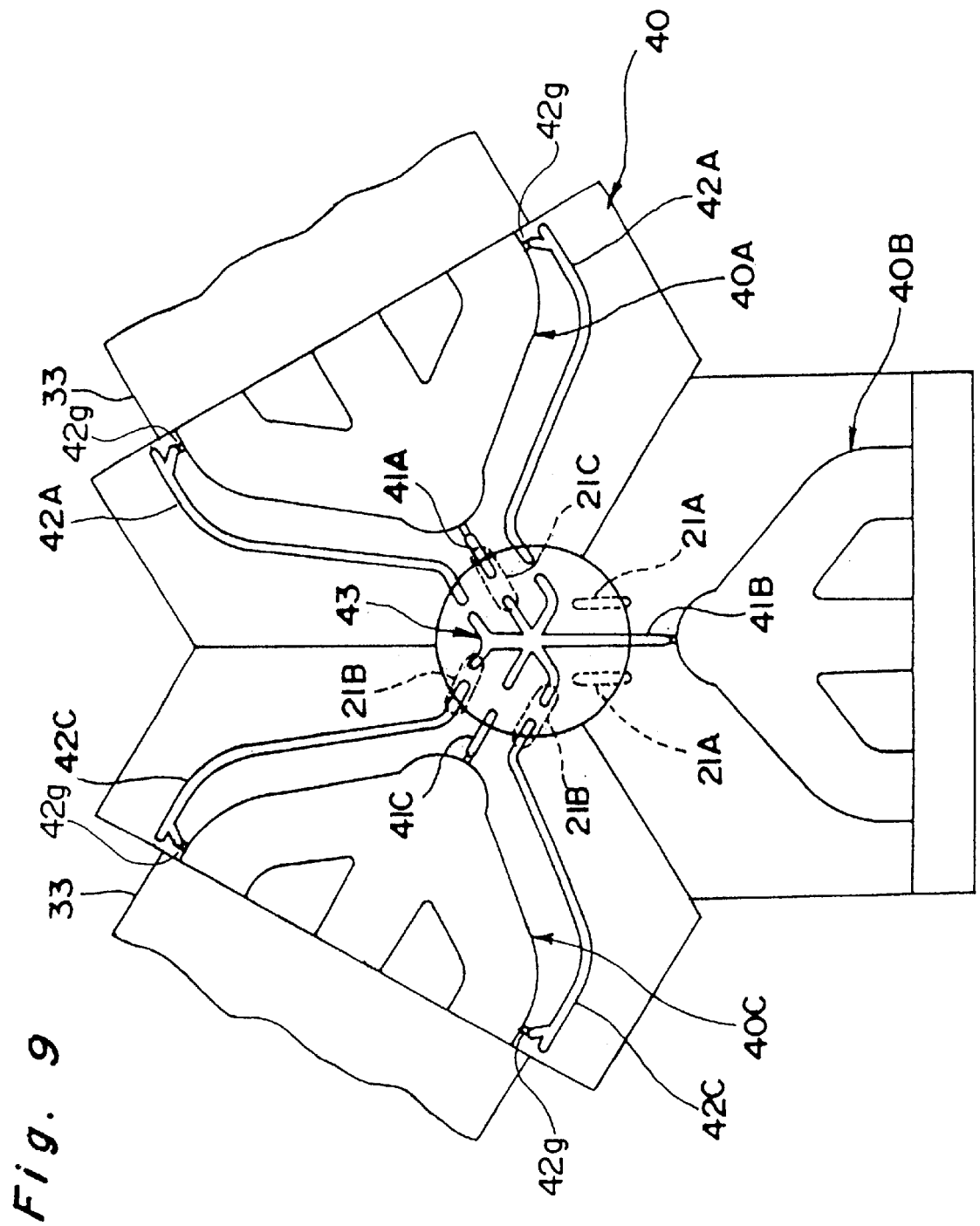
FIG. 9 is an explanatory view in front elevation for explaining a switched-over condition with respect to resin passages in the movable die.
Figure 10:
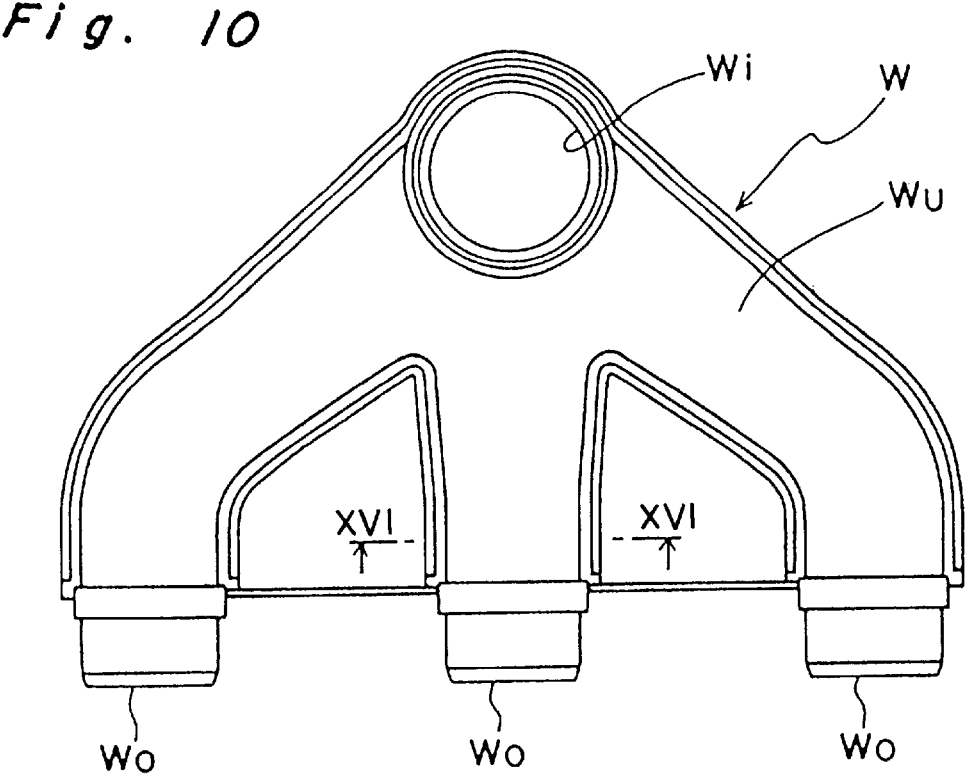
FIG. 10 is an explanatory plan view of a molded product according to the embodiment of the present invention.
Figure 11:
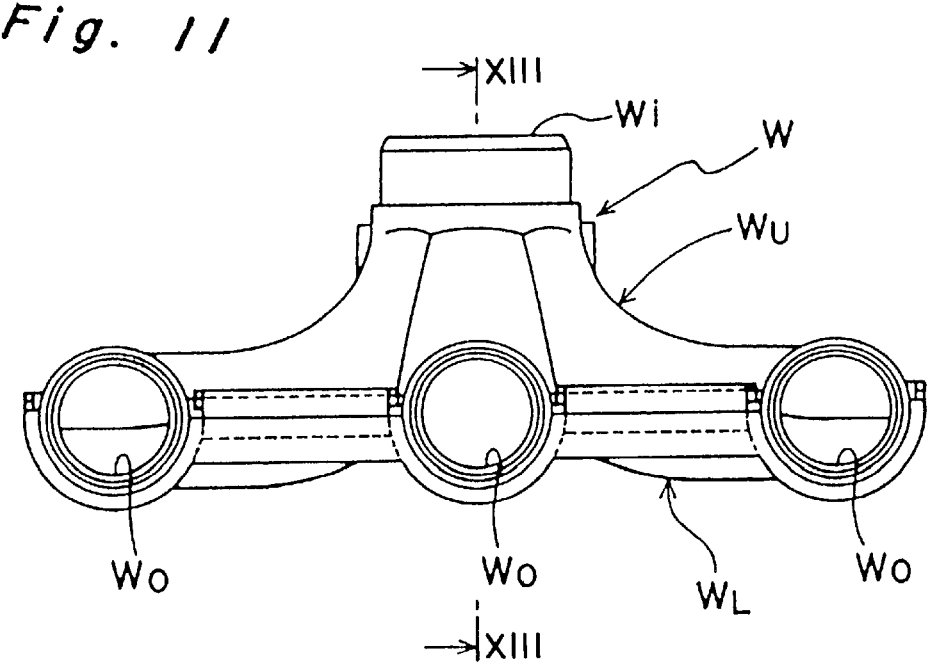
FIG. 11 is an explanatory view in front elevation of the molded product.

In this case, changeover slot 21 of rotor 13 of stationary die 1 is at a rotational position shown by dashed lines in FIG. 9. That is, changeover slot 21C causes primary resin passage 41A for molding portion 40A of movable die 2 to communicate with branched resin passage 43, while a pair of changeover slots 21B cause secondary resin passages 42C for molding portion 40C of movable die 2 to communicate with branched resin passage 43. Primary resin passage 41B for molding portion 40B of movable die 2 is normally held in communication with the branched resin passage 43.

At the rotational position in FIG. 9, on the side of the molding portion 40C at which the secondary resin passage 42C is in communication with the branched resin passage 43, each core portion 33a of the slide die 33 is pushed out and inserted into the tube end portion of the molding portion 40C.

In this condition, the movable die 2 is brought into abutment with the stationary die 1 (see FIGS. 1 and 5), and die clamping is carried out, then melted resin is injected from a molder (not shown), whereupon melted resin is supplied through sprue 12a to the resin passages 41A, 42C, 41B which are in communication with the branched resin passages 41A, 42C, 41B.

As a result, in molding cavities formed by combinations of molding portions of the stationary die 1 and movable die 2 the following molded forms are produced.

Molding portion 40A (female)/ molding portion 20C (male): upper half $W_U$ Molding portion 40B (male)/ molding portion 20A (female): lower half $W_L$ Molding portion 40C (female)/ molding portion 20B (female): finished part W It is noted that in the molding portion 40B of the movable die 2, lower half $W_L$ is molded at all times.

Subsequently, die opening is carried out and a finished component is removed. In this condition of rotor rotation, left-side slide guide 34 in FIGS. 1 to 4 is driven, and left-side two (46b, 46c) of the ejector plates 46a, 46b, 46c are driven.

In this case, lower half $W_L$ is left in the molding portion 20A of the stationary die 1, and upper half $W_U$ is left in the molding portion 40A of the movable die 2.

Figure 4:
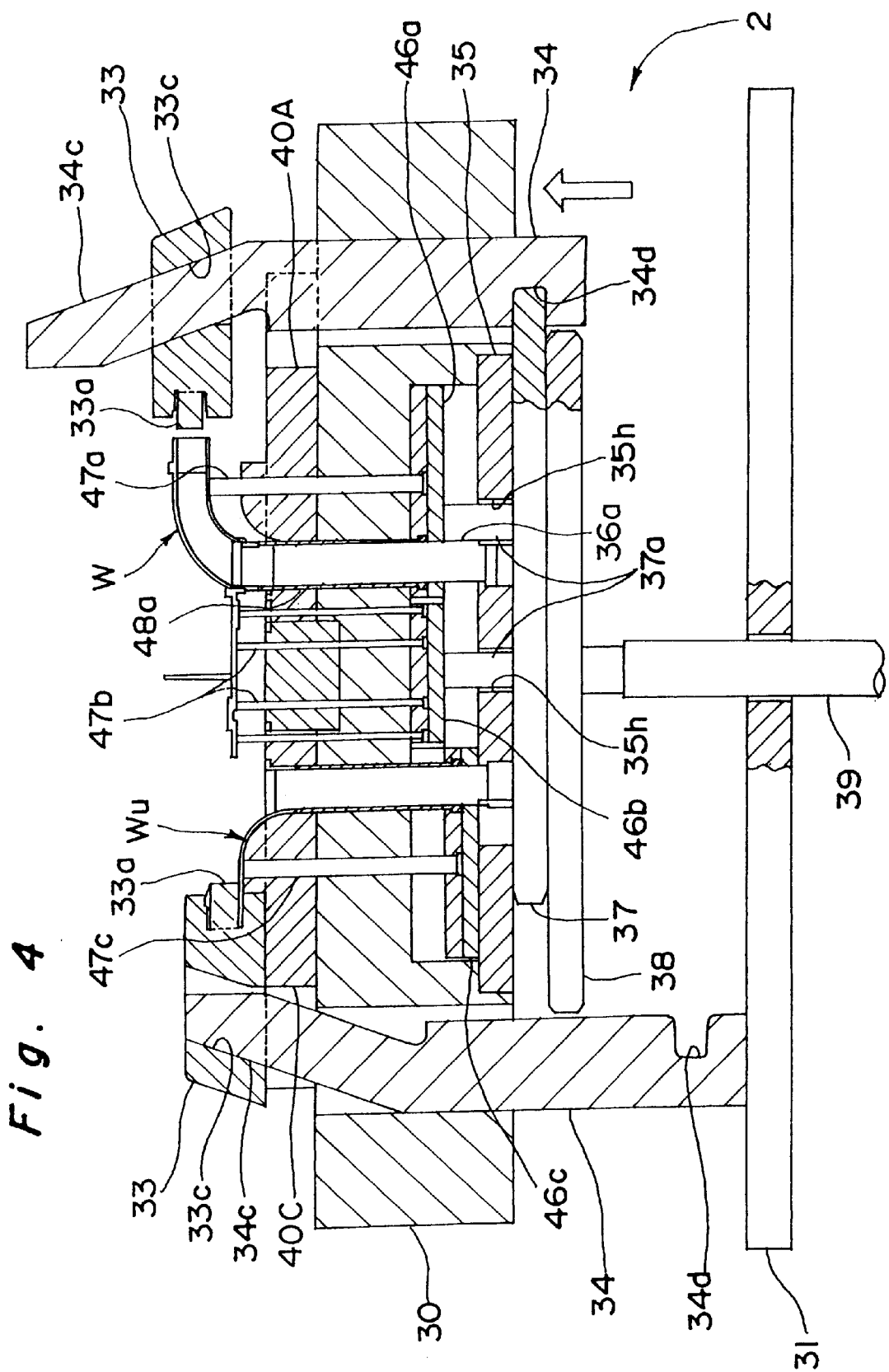
FIG. 4 is an explanatory view in longitudinal section similar to FIG. 1 showing an ejector mechanism of the molding die assembly 3 in driven condition.

In this condition, the rotor 13 is rotated 120 degrees in reverse direction and die clamping is carried out, whereupon operation returns to the initial condition (see FIG. 4). Similar steps are repeated to obtain one finished part W.

That is, the rotor 13 of the stationary die 1 is rotated 120 degrees in forward and reverse directions each time. While repeating the foregoing steps, clamping, injection, and die opening are carried out each time. In this way, one finished component is obtained for each rotational movement of the rotor 13.

The foregoing embodiment relates to an intake manifold for internal combustion engines, but the present invention is not limited to use in such an application; it may be effectively applied to any other kind of synthetic resin tubular member. The above described embodiment concerns an intake manifold molded by the so-called DRI method, but the intake manifold of the invention is not limited to those manufactured by such a method. For example, the intake manifold may be one molded by other manufacturing method, such as DSI method, wherein separate halves are joined with a secondary resin in the molding die.

The present invention is not limited to the foregoing embodiment, and it is needless to say that various improvements and/or design changes are possible without departing from the scope of the invention.

As above described, according to the first aspect of the present invention, the method of manufacturing a synthetic resin tubular member having differently oriented inlet tube portion and outlet tube portion comprises using molding dies for die rotary injection molding (known as DRI) having a slide core adapted to be fitted to a tube end portion of one of the inlet and outlet tube portions and slidable in a direction different from the direction in which die opening and closing is made, in manufacturing a synthetic resin tubular member having differently oriented inlet tube portion and outlet tube portion; and carrying out the steps of core insertion, die clamping, injection, die opening, core removal, ejection, and die rotation, whereby each time when one rotational movement of the molding die pair is made, a primary molding operation for molding separate halves and a secondary molding operation for joining a pair of separate halves are performed so that a finished tubular member will be obtained for each rotational movement of the molding die pair. Therefore, by employing the DRI method it is possible to mold, without involving any inconvenience, a tube end portion oriented differently from the direction in which die opening and closing is made.

That is, as compared with the prior art wherein adhesive bonding or heat melting is carried out for joining separate halves, high bond strength of joined halves and good sealing characteristics of the butt-joined surface can be more stably secured; and by using the DRI method it is possible to achieve higher production efficiency and yet to easily manufacture a tubular member having differently oriented inlet and outlet tube portions.

According to the second aspect of the invention, the apparatus for manufacturing a synthetic resin tubular member having differently oriented inlet tube portion and outlet tube portion comprises a pair of molding dies, rotary means, a plurality of slide cores, a plurality of eject means, core drive means, eject drive means, and changeover means, whereby each time when one rotational movement of the molding dies is made, a primary molding portion for molding separate halves and a secondary molding portion for joining a pair of separate halves are formed so that the tubular member can be obtained in its finished state for each rotational movement of the molding dies. Therefore, by employing the DRI method it is possible to mold, without involving any inconvenience, a tube end portion oriented differently from the direction in which die opening and closing is made.

That is, as compared with the prior art wherein adhesive bonding or heat melting is carried out for joining separate halves, high bond strength of joined halves and good sealing characteristics of the butt-joined surface can be more stably secured; and by using the DRI method it is possible to achieve higher production efficiency and yet to easily manufacture a tubular member having differently oriented inlet and outlet tube portions.

According to the third aspect of the invention, the synthetic resin intake manifold is obtained by bringing a pair of separate halves into abutment with each other in a corresponding pair of molding dies, and filling a melted resin mass into an interior passage defined along a peripheral edge of the abutted portions to thereby join the halves. Therefore, as compared with the prior art wherein adhesive bonding or heat melting is carried out for joining separate halves, high bond strength of joined halves and good sealing characteristics of the butt-joined surface can be more stably secured.

According to the fourth aspect of the invention, the synthetic intake manifold can in effect exhibit the same performance as that of the synthetic intake manifold according to the third aspect of the invention. In particular, since the separate halves are configured to be halves separated along a closed-loop parting line and extends so as to avoid the end surfaces of the inlet and outlet tube portions, the interior passage to be filled with melted resin for joining purposes is configured to have a closed loop shape extending so as to avoid the end surfaces of the tubular member, it being thus possible to improve the roundness of the cylindrical tube end portions. Accordingly, good sealing effect can be maintained when the manifold is fitted to any associated component.

The synthetic resin intake manifold according to the fifth aspect of the invention can in effect exhibit the same performance as that of the synthetic intake manifold according to the third or fourth aspect of the invention. In particular, since the molding dies used in molding separate halves and bringing them into abutment with each other are dies for rotary injection molding (so-called DRI), manufacturing of such intake manifold can be carried out with higher production efficiency by employing the DRI method.

Furthermore, in this case, the molding dies have a slide core adapted to be fitted to a tube end portion of one of the inlet and outlet tube portions which is slidable in a direction different from the direction in which die opening and closing is made, it being thus possible to mold, without involving any inconvenience, a tube end portion oriented differently from the direction in which die opening and closing is made.

Industrial Applicability

As described above, according to the invention, for a synthetic resin tubular member having differently oriented inlet tube portion and outlet tube portion, it is possible to easily mold a tube end portion oriented differently from the direction in which die opening and closing is made. Also, sufficient bond strength and sealing performance can be obtained with respect to the joint portion of joined halves. Therefore, the invention is effectively applicable where, for example, mass production is undertaken of a tubular member, such as intake manifold, for supplying intake air to engine cylinders, which is desired to be manufactured from synthetic resin in place of any conventional metal material for further weight reduction.

What is claimed is:

1. A method of manufacturing a synthetic resin tubular member having differently oriented inlet tube portion and outlet tube portion wherein separate halves of the tubular member are molded in a pair of molding dies, the molded separate halves in the molding dies being brought into abutment with each other, a melted resin mass being filled into an interior passage defined along a peripheral edge of the abutted portions to thereby join the separate halves, the method comprising:

using a pair of molding dies for die rotary injection molding adapted to be opened and closed relative to each other and rotatable in relation to each other over a predetermined angular range, the molding dies having a molding section consisting of at least one male molding portion and two female molding portions in a repetitive sequence of male/female/female in the direction of rotation for each rotational run over the predetermined angular range, the molding dies further having a slide core adapted to be fitted to a tube end portion of one of the inlet and outlet tube portions and slidable in a direction different from the direction in which die opening and closing is made; and carrying out:

the step of core insertion for inserting the slide core into a molding portion of the molding die pair corresponding to the tube end portion of one of the inlet and outlet tube portions;

the step of die clamping for closing and clamping the molding die pair;

the step of injection for injecting a melted resin mass into a molding cavity defined by closing the molding die pair;

the step of die opening for opening the molding die pair;

the step of core removal for removing the slide core from the tube end portion;

the step of ejection for ejecting a molded tubular member from the molding die pair; and the step of die rotation for rotating the dies over a predetermined angle, wherein each time when one rotational movement of the molding die pair is made, a primary molding operation for molding separate halves through a combination of the male molding portion and one female molding portion, and a secondary molding operation for joining a pair of separate halves through a combination of the female molding portions are performed so that a finished tubular member will be obtained for each rotational movement of the molding dies.

2. An apparatus for manufacturing a synthetic resin tubular member having differently oriented inlet tube portion and outlet tube portion, the apparatus comprising:

a pair of molding dies assembled together so as to be opened and closed relative to each other;

rotary means for rotating at least one of the molding dies over a predetermined angle relative to the other molding die;

a plurality of slide cores to be fitted to the tube end of one of the inlet tube portion and outlet tube portion and slidable in a direction different from the direction in which the molding dies are opened and closed;

a plurality of eject means for ejecting a molded tubular member from the molding dies;

core drive means for driving one of the slide cores in the different direction in response to the opening and closing operation of the molding dies;

eject drive means for driving one of the plurality of eject means in response to the opening and closing operation of the molding dies; and changeover means for switching over the connection of a molding die open/close mechanism with the core drive means and eject drive means and for switching over the slide core and eject means to be driven;

the molding dies each having a molding section consisting of at least one male molding portion and two female molding portions in a repetitive sequence of male/female/female in the direction of rotation for each rotational run over the predetermined angular range, such that each time when one rotational movement of the molding dies is made, a primary molding portion for molding separate halves is formed through a combination of the male molding portion and one female molding portion, with a secondary molding portion formed for joining a pair of separate halves through a combination of the female molding portions, wherein a finished tubular member can be obtained for each rotational movement of the molding dies.

3. A method of making a synthetic resin manifold having a plurality of outlet tube portions branched from an inlet tube portion, with the outlet tube portions differently oriented from the inlet tube portion, characterized in that the synthetic resin manifold is obtained by:

bringing a pair of separate halves into abutment with each other in a corresponding pair of molding dies, and filling a melted resin mass into an interior passage defined along a peripheral edge of the abutted portions to thereby join the halves, wherein the pair of molding dies are rotary injection molding dies adapted to be opened and closed relative to each other and rotatable in relation to each other over a predetermined angular range, the molding dies having a molding section consisting of at least one male molding portion and two female molding portions in a repetitive sequence of male/female/female in the direction of rotation for each rotational run over the predetermined angular range, the molding dies further having a slide core adapted to be fitted to a tube end portion of one of the inlet and outlet tube portions and slideable in a direction different from the direction in which die opening and closing is made, and wherein each time when one rotational movement of the molding die pair is made, a primary molding operation for molding separate halves through a combination of the male molding portion and one female molding portion, and a secondary molding operation for joining a pair of separate halves through a combination of the female molding portions are performed so that a finished component will be obtained for each rotational movement of the molding dies.

4. A method of making a synthetic resin intake manifold as set forth in claim 3, wherein the separate halves are configured to be halves separated along a closed-loop parting line extending to avoid the end surfaces of the inlet and outlet tube portions.

5. A method of manufacturing a synthetic resin tubular member having differently oriented inlet and outlet tube portions, the method comprising:

providing a pair of molding dies that are movable to open and close relative to each other and rotatable relative to each other over a predetermined angular step, the molding dies further having a molding section comprising a male molding portion, a first female molding portion, and a second female molding portion spaced circumferentially along the direction of rotation, the molding dies further having a slide core adapted to be fitted to a tube end portion of one of the inlet and outlet tube portions, the slide core being slideable in a direction different from the direction in which dies open and close;

inserting the slide core into the molding portion corresponding to the tube end portion of one of the inlet and outlet tube portions;

closing and clamping the molding die pair;

simultaneously forming separate halves of the tubular member by injecting melted resin into a combination of the male molding portion and one of the female molding portions and joining a pair of separate halves previously formed by injecting melted resin into an interior passage defined along a peripheral edge of the abutting portions of the separate halves retained in the female molding portions to obtain a finished tubular member;

opening the molding die pair;

removing the slide core from the tube end portion;

ejecting a molded tubular member from the molding die pair; and rotating one of the dies over the predetermined angular step, wherein each time the one die is rotated over the predetermined angular step, a primary molding operation in which separate halves are molded through a combination of the male molding portion and one of the female molding portions and a secondary molding operation in which a pair of separate halves are joined through a combination of the female molding portions are performed to obtain a finished tubular member for each rotational movement of the one molding die.

6. An apparatus for manufacturing a synthetic resin tubular member having differently oriented inlet tube portion and outlet tube portion, the apparatus comprising:

a pair of molding dies that are movable to open and close relative to each other and rotatable relative to each other over a predetermined angular step, the molding dies further having a molding section comprising a male molding portion, a first female molding portion, and a second female molding portion spaced circumferentially along the direction of rotation; and a plurality of slide cores adapted to be fitted to the tube end portion of one of the inlet and outlet tube portions, the slide cores being slideable in a direction different from the direction in which dies open and close, wherein each time the one die is rotated over the predetermined angular step, a primary molding operation in which separate halves are molded through a combination of the male molding portion and one of the female molding portions and a secondary molding operation in which a pair of separate halves are joined through a combination of the female molding portions are performed to obtain a finished tubular member for each rotational movement of the one molding die.

7. A synthetic resin intake manifold consisting essentially of:

a first half body having a seamless tubular inlet and a plurality of seamless tubular outlet, wherein the seamless outlets are differently oriented from the seamless inlet, wherein the first body has first abutting peripheral edge portions;

a second half body having second abutting peripheral edge portions that abut against the first abutting peripheral edge portions, wherein the first and second abutting peripheral edge portions form an interior passage when abutted together, and wherein the first and second half bodies are joined together by filling melted resin into the interior passage.

* * * * *